(12) United States Patent
Besse

(10) Patent No.: US 8,335,044 B1
(45) Date of Patent: Dec. 18, 2012

(54) MEDICINE CONTAINER DATA ILLUMINATION AND MAGNIFICATION SYSTEM

(76) Inventor: Suzanne Besse, Boca Raton, FL (US)

( * ) Notice: Subject to any disclaimer, the term of this patent is extended or adjusted under 35 U.S.C. 154(b) by 123 days.

(21) Appl. No.: 12/924,685

(22) Filed: Oct. 1, 2010

(51) Int. Cl.
G02B 27/02 (2006.01)
(52) U.S. Cl. ....................................................... 359/803
(58) Field of Classification Search ........... 359/798–805
See application file for complete search history.

(56) References Cited

U.S. PATENT DOCUMENTS 7,630,149 B2 * 12/2009 Yip et al. ...................... 359/802
7,916,406 B2 * 3/2011 Yip et al. ...................... 359/802

* cited by examiner

*Primary Examiner* — Thomas K Pham
*Assistant Examiner* — Vipin Patel

(57) ABSTRACT

A housing has a handle section and an operational section. The handle section has front and rear faces, parallel upper and lower edges, and interior and exterior edges. The rear face is open to form a chamber. The chamber has a cover. A small aperture is provided in the handle section. The operational section has a front face and a rear face. The operational section has arcuate concentric upper and lower edges and interior and exterior edges. The interior edge of the operational section is coupled to the interior edge of the handle section. The operational section is formed with a large aperture. A transparent, partially-cylindrical magnifying glass is located within and fills the large aperture.

2 Claims, 4 Drawing Sheets

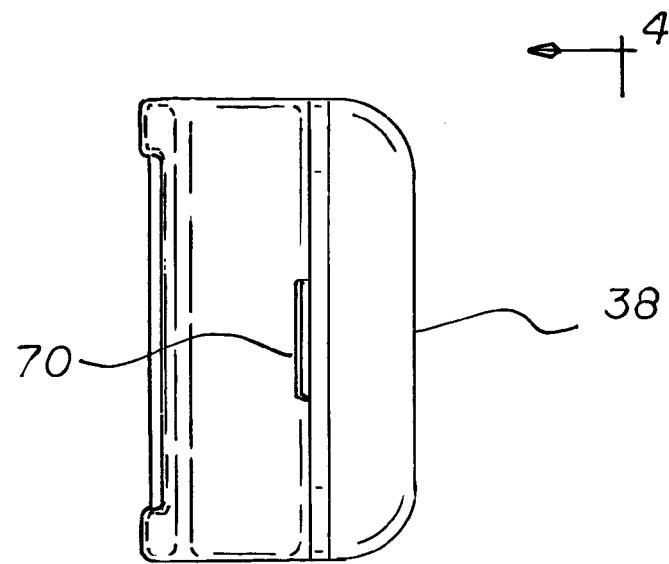
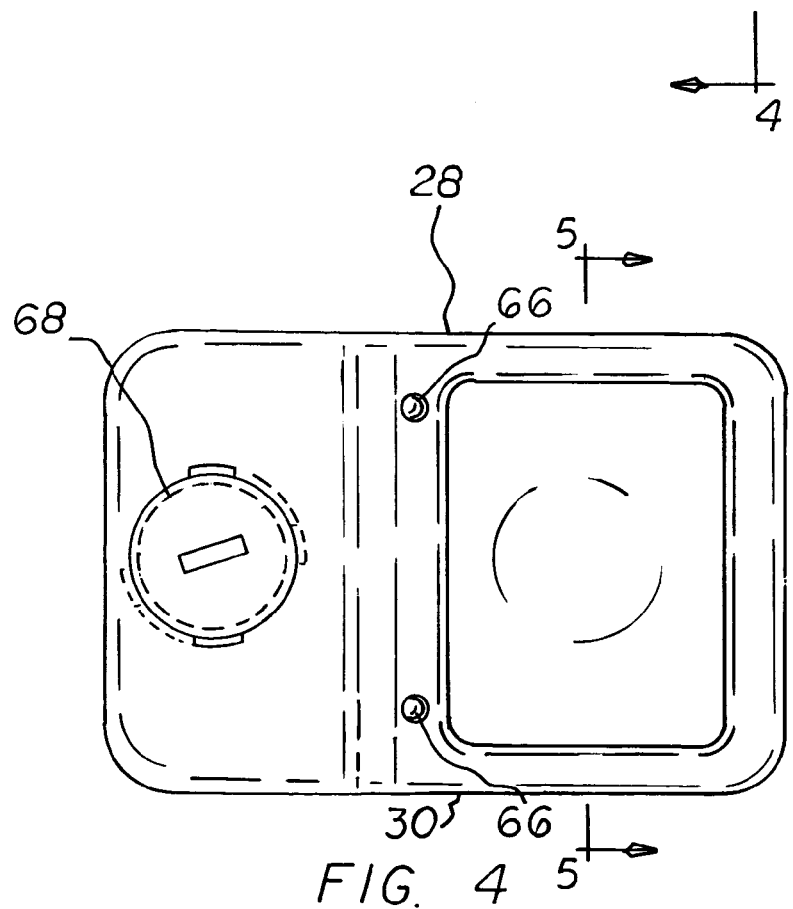

FIG. 5
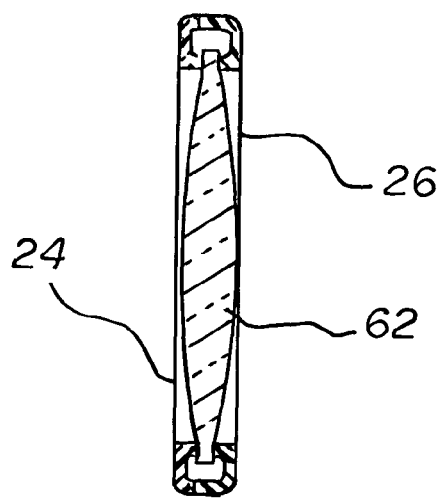
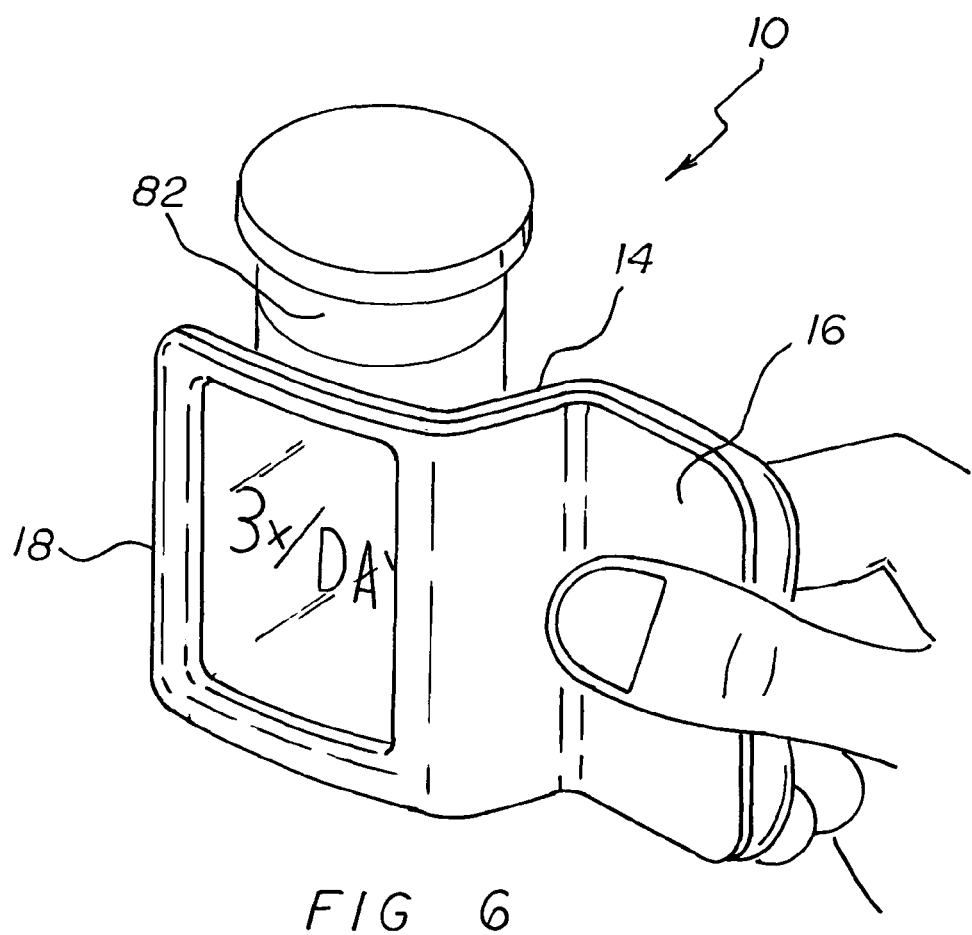
FIG 6

MEDICINE CONTAINER DATA ILLUMINATION AND MAGNIFICATION SYSTEM

BACKGROUND OF THE INVENTION

Field of the Invention

The present invention relates to a medicine container data illumination and magnification system and more particularly pertains to concurrently illuminating and magnifying data on a label of a medicine container, the illuminating and magnifying being done in a safe, convenient and economical manner.

SUMMARY OF THE INVENTION

In view of the disadvantages inherent in the known types of medicine container systems of known designs and configurations now present in the prior art, the present invention provides an improved medicine container data illumination and magnification system. As such, the general purpose of the present invention, which will be described subsequently in greater detail, is to provide a new and improved medicine container data illumination and magnification system and method which has all the advantages of the prior art and none of the disadvantages.

To attain this, the present invention essentially comprises a medicine container data illumination and magnification system. First provided is a housing. The housing is formed of a front part and a rear part. The housing has a handle section. The housing has an operational section. The housing is fabricated of a rigid polymeric material chosen from the class of rigid polymeric materials including abs plastic and electroplate over abs plastic. The housing is symmetrically formed for ready use by a right-handed person. The housing may be used by a left-handed person when inverted.

The handle section is formed in a generally planar, generally rectilinear configuration. The handle section has front and rear faces. The handle section has parallel upper and lower edges. The handle section has interior and exterior edges. The rear face is open. In this manner a chamber is formed. The chamber has a cover. The cover selectively covers and uncovers the chamber. A slot is provided. The slot removably couple the cover to the handle section. The front face has a centrally located small aperture. The small aperture has an area between 2 and 6 percent of the area of the front face of the handle section.

The operational section is formed in an arcuate section direction. The operational section has a front face. The operational section has a concentric rear face. The operational section has arcuate concentric upper and lower edges. The operational section has interior and exterior edges. The interior edge of the operational section is fabricated with the interior edge of the handle section. The operational section has a centrally located large aperture. The large aperture has an area greater than 50 percent of the area of the operational section. The operational section has a radius of curvature. The operational section has an axis of rotation spaced from the rear face of the handle section.

Provided next is a transparent magnifying glass. The magnifying glass is located within and fills the large aperture. The magnifying glass has a partially-cylindrical configuration. The magnifying glass has a radius of curvature and an axis of rotation the same as the operational section. The magnifying glass is fabricated of a transparent polymer chosen from the class of transparent polymers including polycarbonate and PMMA acrylic. The magnifying glass is configured to provide between 1.0 and 3.5 magnification.

The operational components include two light emitting diodes. The light emitting diodes are provided in the rear face of the operational section adjacent to and between the upper and lower edges of the operation section. The operational components include a battery, preferably a long life lithium battery. The battery is provided within the chamber. In this manner the diodes are powered. The operational components also include a button. The button extends through the small aperture. The operational components further include wires and an integrated circuit. The wires couple the diodes and battery and button. In this manner the diodes may be selectively illuminated when the button is pushed and held. Further in this manner illumination may be terminated when the button is released.

Interlocking projections and recesses are provided on the front part and the rear part. These are for coupling purposes.

Provided last is a cylindrical medicine container. The medicine container includes data to be illuminated and read. The data is located at a distance from the magnifying glass. The medicine container has a radius of curvature less than the radius of curvature of the magnifying glass. The medicine container has an axis of rotation parallel with the axis of rotation of the magnifying glass.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved medicine container data illumination and magnification system which has all of the advantages of the prior art medicine container systems of known designs and configurations and none of the disadvantages.

It is another object of the present invention to provide a new and improved medicine container data illumination and magnification system which may be easily and efficiently manufactured and marketed.

It is further object of the present invention to provide a new and improved medicine container data illumination and magnification system which is of durable and reliable constructions.

An even further object of the present invention is to provide a new and improved medicine container data illumination and magnification system which is susceptible of a low cost of manufacture with regard to both materials and labor, and which accordingly is then susceptible of low prices of sale to the consuming public, thereby making such medicine container data illumination and magnification system economically available to the buying public.

Even still another object of the present invention is to provide a medicine container data illumination and magnification system for concurrently illuminating and magnifying data on a label of a medicine container, the illuminating and magnifying being done in a' safe, convenient and economical manner.

Lastly, it is an object of the present invention to provide a new and improved medicine container data illumination and magnification system. A housing has a handle section and an operational section. The handle section has front and rear faces, parallel upper and lower edges, and interior and exterior edges. The rear face is open to form a chamber. The chamber has a cover. A small aperture is provided in the handle section. The operational section has a front face and a rear face. The operational section has arcuate concentric upper and lower edges and interior and exterior edges. The interior edge of the operational section is coupled to the interior edge of the handle section. The operational section is formed with a large aperture. A transparent, partially-cylindrical magnifying glass is located within and fills the large aperture.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the primary and preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a end elevational view of the system taken along line 3-3 of FIG. 1.

FIG. 4 is a rear elevational view of the system taken along line 4-4 of FIG. 3

FIG. 5 is a cross sectional view of the system taken along line 5-5 of FIG. 4.

FIG. 6 is a perspective view of the system while in use.

The same reference numerals refer to the same parts throughout the various Figures.

DESCRIPTION OF THE PREFERRED EMBODIMENT

Figure 1:
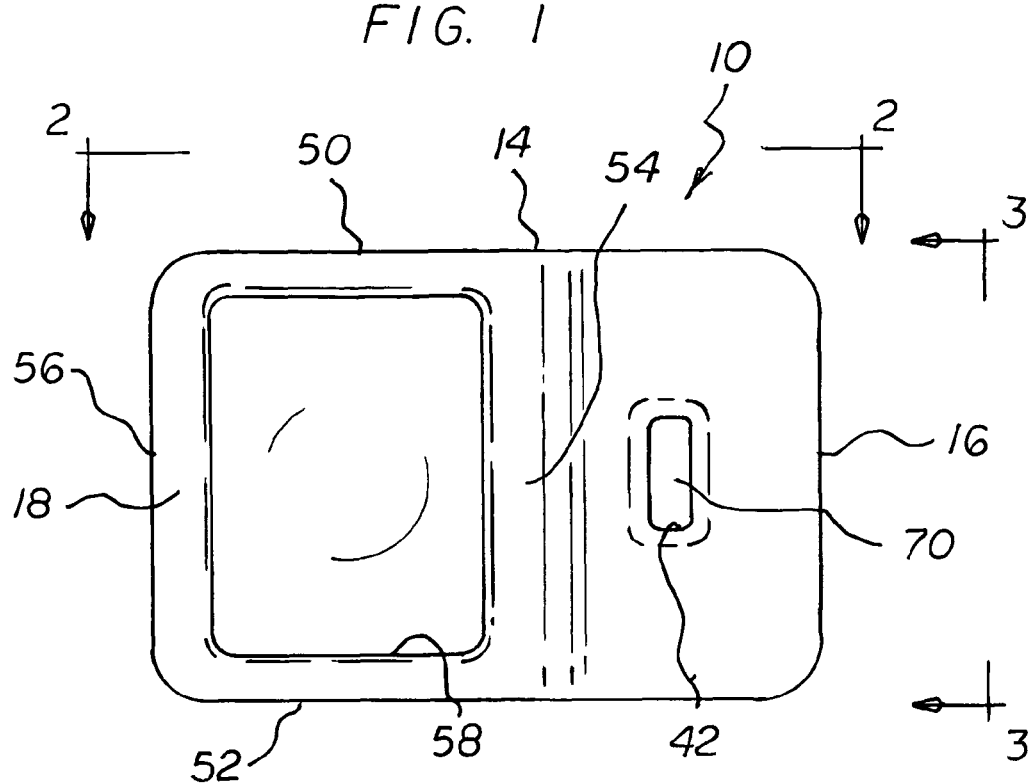
FIG. 1 is a front elevational view of a medicine container data magnification system constructed in accordance with the principles of the present invention.
Figure 2:
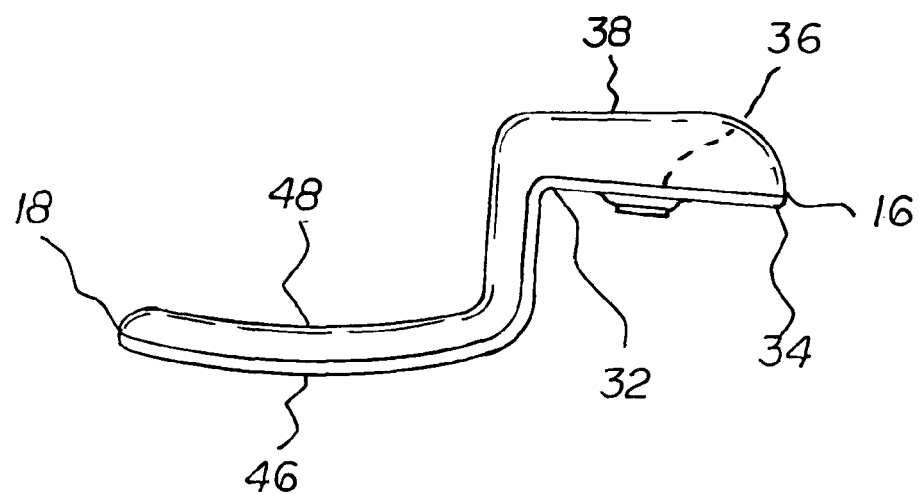
FIG. 2 is a side elevational view of the system taken along line 2-2 of FIG. 1.

With reference now to the drawings, and in particular to FIG. 1 thereof, the preferred embodiment of the new and improved medicine container data illumination and magnification system embodying the principles and concepts of the present invention and generally designated by the reference numeral 10 will be described. The system is adapted for use on medicine container labels and medication instructions including syringes, prescription medications, over the counter medications and the like. The magnification lens also preferably includes a light feature to aid users with visual challenges and to enhance use in dimly-lit areas. The unique step design is for ease of holding over curved areas that require reading enhancement.

The present invention, the medicine container data illumination and magnification system 10 is comprised of a plurality of components. Such components in their broadest context include a housing, a transparent and partially-cylindrical magnifying glass and operational components. Such components are individually configured and correlated with respect to each other so as to attain the desired objective.

First provided is a housing 14. The housing is formed of a front part and a rear part. The housing has a handle section 16. The housing has an operational section 18. The housing is fabricated of a rigid polymeric material chosen from the class of rigid polymeric materials including abs plastic and electroplate over abs plastic. The housing is symmetrically formed for ready use by a right-handed person. Note FIG. 6. The housing may be used by a left-handed person when inverted.

The handle section is formed in a generally planar, generally rectilinear configuration. The handle section has front and rear faces 24, 26. The handle section has parallel upper and lower edges 28, 30. The handle section has interior and exterior edges 32, 34. The rear face is open. In this manner a chamber 36 is formed. The chamber has a cover 38. The cover selectively covers and uncovers the chamber. A slot is provided. The slot removably couple the cover to the handle section. The slot is of a size to be rotated by a coin when changing the battery. The front face has a centrally located small aperture 42. The small aperture has an area between 2 and 6 percent of the area of the front face of the handle section.

The operational section is formed in an arcuate section direction. The operational section has a front face 46. The operational section has a concentric rear face 48. The operational section has arcuate concentric upper and lower edges 50, 52. The operational section has interior and exterior edges 54, 56. The interior edge of the operational section is fabricated with the interior edge of the handle section. The operational section has a centrally located large aperture 58. The large aperture has an area greater than 50 percent of the area of the operational section. The operational section has a radius of curvature. The operational section has an axis of rotation spaced from the rear face of the handle section.

Provided next is a transparent magnifying glass 62. The magnifying glass is located within and fills the large aperture. The magnifying glass has a partially-cylindrical configuration. The magnifying glass has a radius of curvature and an axis of rotation the same as the operational section. The magnifying glass is preferably fabricated of a transparent polymer chosen from the class of transparent polymers including polycarbonate and PMMA acrylic. The magnifying glass is configured to provide between 1.0 and 3.5 magnification. Note is also taken that the vertical lens is used to maximize the viewing field when reading medication instructions or medication bottle labels, RX prescribed and over the counter as well as syringes.

The operational components include two light emitting diodes 66. The diodes lie in a line parallel with the axis of rotation of the operational section. The light emitting diodes are provided in the rear face of the operational section adjacent to and between the upper and lower edges of the operation section. The operational components include a battery 68, preferably a long life lithium battery. The battery is provided within the chamber. In this manner the diodes are powered. The operational components also include a button 70. The button extends through the small aperture. The button is preferably colorized to assist a user in locating the light switch. The operational components further include wires 72 and an integrated circuit 74. The wires couple the diodes and battery and button. In this manner the diodes may be selectively illuminated when the button is pushed and held. Further in this manner illumination may be terminated when the button is released.

Figure 7:
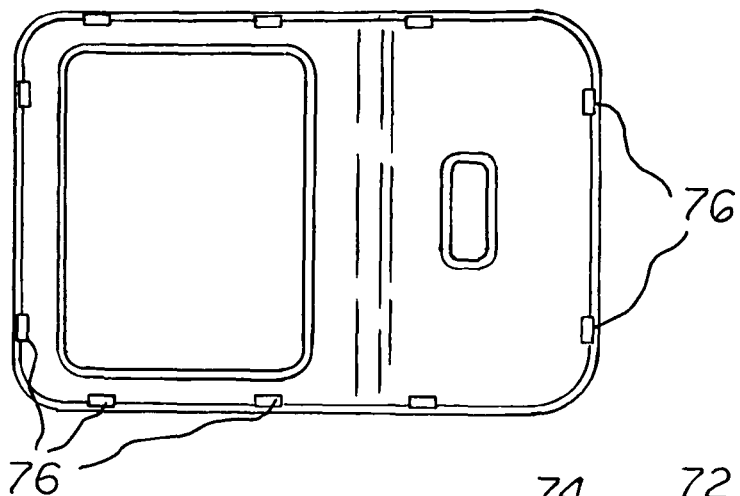
FIG. 7 is a front elevational view of the interior of the front housing part.
Figure 8:
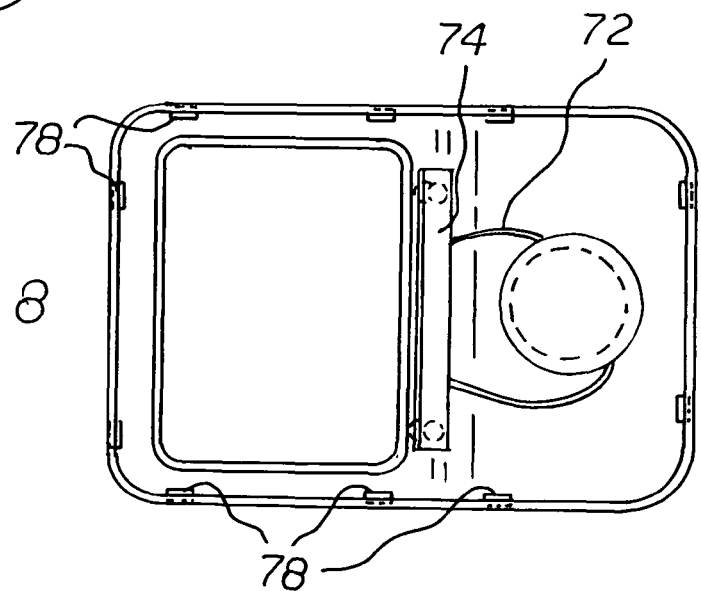
FIG. 8 is a front elevational view of the interior of the rear housing part.
Figure 9:
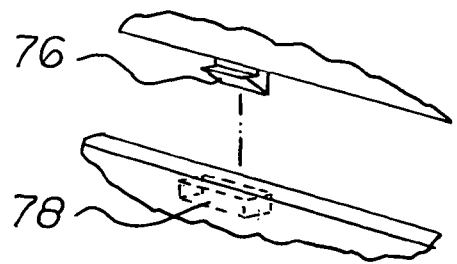
FIG. 9 is a perspective illustration of the coupling components of the front and rear housing parts.

As illustrated in FIGS. 7 through 9, interlocking projections 76 and recesses 78 are provided on the front part and the rear part for coupling purposes. The projections and recesses are preferably mortises and tenons.

Provided last is a cylindrical medicine container 82. The medicine container includes data to be illuminated and read. The data is located at a distance from the magnifying glass. The medicine container has a radius of curvature less than the radius of curvature of the magnifying glass. The medicine container has an axis of rotation parallel with the axis of rotation of the magnifying glass. The system is configured to provide legibility and compliance by improved visibility of type on RX prescription and over the counter medicinal bottle labels for pill or liquid medication as well as syringes. The system is also configured to provide universal left or right hand flexibility of use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An illumination and magnification system comprising:
   a housing having a handle section and an operational section;
   the handle section having front and rear faces, parallel upper and lower edges, and interior and exterior edges, the rear face being open to form a chamber, a cover for the chamber, a small aperture in the handle section;
   the operational section having a front face and a rear face and arcuate concentric upper and lower edges and interior and exterior edges, the interior edge of the operational section being integrally formed with the interior edge of the handle section to position the handle section and the operational section laterally spaced from each other, the operational section being formed with a large aperture;
   a transparent, partially-cylindrical magnifying glass located within and filling the large aperture;
   a light positioned in the rear face of the operational section;
   a battery located within the chamber for the powering of the light;
   a small aperture formed in the rear face of the handle section;
   an on/off button extending through the small aperture, wires coupling the light and the battery and button to selectively illuminate the light when the button is pushed and held and to terminate the illumination when the button is released; and
   data to be read, the data being located at a distance from the magnifying glass, the data having a radius of curvature less than the radius of curvature of the magnifying glass, the data having an axis of rotation parallel with the axis of rotation of the magnifying glass, the data being on medicine container labels and medication instructions including syringes, prescription medications, over the counter medications and the like.

2. A medicine container data illumination and magnification system (10) for concurrently illuminating and magnifying data on a label of a medicine container, the system comprising, in combination:
   a housing (14) formed of a front part and a rear part and having a handle section (16) and an operational section (18) and fabricated of a rigid polymeric material chosen from the class of rigid polymeric materials including abs plastic and electroplate over abs plastic, the housing being symmetrically formed for ready use by a right-handed person or when inverted by a left-handed person;
   the handle section being formed in a generally planar, generally rectilinear configuration having front and rear faces (24), (26) and parallel upper and lower edges (28), (30) and interior and exterior edges (32), (34), the rear face being open to form a chamber (36), a cover (38) to selectively cover and uncover the chamber, a slot removably coupling the cover to the handle section, the front face being formed with a centrally located small aperture (42), the small aperture having an area between 2 and 6 percent of the area of the front face of the handle section;
   the operational section being formed in an arcuate section direction and having a front face (46) and a concentric rear face (48) and arcuate concentric upper and lower edges (50), (52) and interior and exterior edges (54), (56), the interior edge of the operational section being fabricated with the interior edge of the handle section, the operational section being formed with a centrally located large aperture (58), the large aperture having an area greater than 50 percent of the area of the operational section, the operational section having a radius of curvature and an axis of rotation spaced from the rear face of the handle section;
   a transparent magnifying glass (62) located within and filling the large aperture, the magnifying glass having a partially-cylindrical configuration, the magnifying glass having a radius of curvature and an axis of rotation the same as the operational section, the magnifying glass being fabricated of a transparent polymer chosen from the class of transparent polymers including polycarbonate and PMMA acrylic, the magnifying glass being configured to provide between 1.0 and 3.5 magnification;
   operational components including two light emitting diodes (66) in the rear face of the operational section adjacent to and between the upper and lower edges of the operation section, a battery (68) within the chamber for powering the diodes, a button (70) extending through the small aperture, wires (72) and an integrated circuit (74) coupling the diodes and battery and button to selectively illuminate the diodes when the button is pushed and held and to terminate the illumination when the button is released;

interlocking projections (76) and recesses (78) are provided on the front part and the rear part for coupling purposes; and a cylindrical medicine container (82) with data to be illuminated and read, the data located at a distance from the magnifying glass, the medicine container having a radius of curvature less than the radius of curvature of the magnifying glass, the medicine container having an axis of rotation parallel with the axis of rotation of the magnifying glass.

\* \* \* \* \*